United States Patent
Umezawa et al.

(10) Patent No.: US 6,515,211 B2
(45) Date of Patent: Feb. 4, 2003

(54) MUSIC PERFORMANCE ASSISTANCE APPARATUS FOR INDICATING HOW TO PERFORM CHORD AND COMPUTER PROGRAM THEREFOR

(75) Inventors: Satoru Umezawa, Kakegawa (JP); Mitsuo Hori, Kamakura (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 10/105,783

(22) Filed: Mar. 25, 2002

(65) Prior Publication Data

US 2002/0134224 A1 Sep. 26, 2002

(30) Foreign Application Priority Data

Mar. 23, 2001 (JP) ........................................ 2001-084961

(51) Int. Cl.[7] ................................................. G09B 15/02
(52) U.S. Cl. .............. 84/477 R; 84/485 R; 84/DIG. 22
(58) Field of Search .................... 84/637, 669, 443, 84/477 R, 478, 485 R, DIG. 22

(56) References Cited

U.S. PATENT DOCUMENTS

| | | | |
|---|---|---|---|
| 3,837,256 A | | 9/1974 | Gullickson .................. 84/478 |
| 4,480,521 A | * | 11/1984 | Schmoyer .................. 84/478 X |
| 4,587,878 A | * | 5/1986 | Nakada et al. ......... 84/DIG. 22 |
| 5,214,231 A | | 5/1993 | Ernst et al. .................. 84/652 |
| 5,859,382 A | | 1/1999 | Funaki ........................ 84/637 |

* cited by examiner

*Primary Examiner*—Stanley J. Witkowski
(74) *Attorney, Agent, or Firm*—Rossi & Associates

(57) ABSTRACT

Display device is supplied with basic screen display data for displaying a basic screen including a plurality of chord names to be indicated on the basic screen, and displays the basic screen on the basis of the basic screen display data. For example, the basic screen may be one listing names of chords to be used in a selected music piece in accordance with progression of the selected music piece. There is provided a memory storing, for each chord, playing-manner screen display data for displaying a playing manner screen indicative of a model playing manner corresponding to the chord. On the basis of an instruction by a user, a desired chord is selected from among the plurality of chord names indicated on the basic screen displayed on the display device, and the playing-manner screen display data corresponding to the selected chord name are read out from the memory. The display device displays, along with the basic screen, the playing manner screen indicative of the model playing manner corresponding to the selected chord name on the basis of the playing-manner screen display data read out from the memory. The display device may simultaneously display playing manner screens for a plurality of different chords. Also, the display device may display the playing manner screen in a highlighted fashion.

16 Claims, 5 Drawing Sheets

(a) (MUSIC SCORE SCREEN)

```
Em  Em/D  C  D  Em
(INTRO)

Em   B7  Em  G    D  G    Em  C   D G
ANATANI   SAYOUNARATTEIERUNOWA  KYODAKE

Em   B7  Em B7 G      D  G      Am7  D7     G  B7 Em
- - - - - - - - - - - - - - - - - - - - - - - - - - -

D     Em
SONNA  KIGASHITE
```

(b) (CHORD SCREEN 1)          (c) (CHORD SCREEN 2)

(d) (CHORD SCREEN 3)

MUSIC PERFORMANCE ASSISTANCE APPARATUS FOR INDICATING HOW TO PERFORM CHORD AND COMPUTER PROGRAM THEREFOR

BACKGROUND OF THE INVENTION

The present invention relates to a music performance assistance apparatus for visually indicating, on a display screen, an appropriate or model manner of performing a chord on a predetermined musical instrument, and a computer program therefor. For example, the present invention concerns an improved music performance assistance apparatus which can visually indicate an appropriate manner of playing or manipulating a musical instrument to perform a particular chord in response to user designation of any one of chord names displayed on the display screen in progression order of a music piece, and which can visually indicate respective appropriate manners of playing the musical instrument for a plurality of chords.

For beginners, it is often very difficult to master step by step how to play a musical instrument by actually manipulating the musical instrument while merely viewing a textbook having music scores and the like written thereon. Thus, with the widespread use of personal computers, there have recently emerged so-called music performance assistance systems, each of which allows any interested user to master how to play an electronic musical instrument by the aide of a computer connected with the musical instrument. Each of the conventionally-known music performance assistance apparatus employed in such systems displays, on a predetermined display device, a "chord selecting screen" indicating chord roots (e.g., pitch names like "C", "E", "G#", "F" and "A") and chord types (e.g., "major", "minor", "seventh", "augmented" and "diminished") so that a user can select desired ones of the chord roots and chord types indicated on the chord selecting screen. The music performance assistance apparatus identifies one particular chord on the basis of the combination of the user-selected chord root and type; for example, when the user-selected chord root and type are "C" and "major", respectively, the assistance apparatus identifies the chord as a "C major chord". Then, the music performance assistance apparatus displays, on the display device, an appropriate manner of playing or manipulating the musical instrument to perform the identified chord, i.e. a model instrument-playing manner for the identified chord; for example, in the case of a string instrument such as a guitar, the apparatus displays fingers to be used to depress strings for the chord performance. Namely, every time a need arises, the user executes input operation for selecting both the root and type of a particular chord for which he or she wants to learn the appropriate manner of manipulating the musical instrument so that the corresponding model instrument-playing manner is displayed on the display device. Then, by visually ascertaining the displayed model instrument-playing manner, the user can learn how to perform the particular chord on the musical instrument. Namely, the conventional performance assistance apparatus are designed to display only one model instrument-playing manner for a single chord at a time in response to designation by the user, so as to provide visual music performance assistance or guide to the user.

As set forth above, with the conventionally-known music performance assistance apparatus, it is necessary for the user to ascertain what kinds of chords are used in a desired music piece and then perform predetermined chord-selecting input operation so as to cause the display device to display a model instrument-playing manner for a particular one of the chords whenever the user wants to refer to the model instrument-playing manner for visual performance assistance; besides, the model instrument-playing manner only for one chord, not for a plurality of different chords, can be displayed at a time. Thus, if the user wants to refer to respective model instrument-playing manners for two or more chords, the user has to interrupt the performance to execute the chord-selecting input operation for each of the chords, which would unavoidably result in poor usability of the assistance apparatus. Namely, the user must execute the chord-selecting input operation as many times as the number of chords for which the model instrument-playing manners are to be displayed on the display device; for example, in case the user wants to see the model instrument-playing manners for all the chords used in a music piece, the chord-selecting input operation must be executed a great many times correspondingly, which would thus disadvantageously become extremely time-consuming, troublesome and complex tasks on the part of the user.

SUMMARY OF THE INVENTION

It is therefore an object of the present invention to provide a technique of allowing a user to refer to a model instrument-playing manner for any desired chord with only simple operation or instruction.

It is another object of the present invention to provide a technique of simultaneously displaying respective model instrument-playing manners for a plurality of chords to thereby allow a user to promptly ascertain appropriate manners of performing the individual chords on a musical instrument.

According to one aspect of the present invention, there is provided a music performance assistance apparatus which comprises: a display device; a supply device that supplies the display device with basic screen display data for displaying a basic screen including a plurality of chord names to be indicated on the basic screen, the display device displaying the basic screen indicating the plurality of chord names on the basis of the basic screen display data supplied by the supply device; a storage device that stores, for each chord, playing-manner screen display data for displaying a playing manner screen indicative of a model playing manner corresponding to the chord; and a processor coupled with the display device and the storage device. The processor is adapted to: select a chord name from among the plurality of chord names indicated on the basic screen displayed on the display device, on the basis of an instruction by a user; and read out, from the storage device, the playing-manner screen display data corresponding to the selected chord name. In this music performance apparatus, the display device displays, along with the basic screen, a playing manner screen indicative of an appropriate or model playing manner corresponding to the selected chord name on the basis of the playing-manner screen display data read out by the processor from the storage device.

Thus, by the user only giving an instruction for selecting a chord mane, a playing manner screen indicative of a model playing manner corresponding to the selected chord name (i.e., an appropriate manner of performing the chord on a predetermined musical instrument, such as an appropriate manner of operating strings of a guitar) is displayed on the display device along with the basic screen. In this way, a model playing manner for any user-desired chord can be referred to on the display device with simple user operation.

As an example, the basic screen may be one listing names of chords used in a selected music piece in accordance with progression of the selected music piece. Therefore, with only simple user operation of selecting a desired one of the chord names indicated on the basic screen, the playing manner screens indicative of the model playing manners for any desired chords can be displayed in accordance with progression of the music piece, which is very useful. The display device may simultaneously display the playing manner screens for a plurality of different chords. Further, the playing manner screen may be displayed in a highlighted fashion for improved viewability.

The present invention may be implemented as a music performance assistance system comprising a server apparatus and client terminal interconnected via a communication network.

Namely, according to another aspect of the present invention, there is provided a server apparatus connectable with a client terminal, which comprises: a first storage section that stores basic screen display data for allowing the client terminal to display a basic screen including a plurality of chord names; a transmission section that transmits the basic screen display data to the client terminal; a second storage section that stores, for each chord, playing-manner screen display data for displaying a playing manner screen indicative of a model playing manner corresponding to the chord; a reception section that receives, from the client terminal, request information requesting the playing manner screen corresponding to a desired one of the plurality of chord names included in the basic screen; and a control section that, in response to the request information received by the reception section, reads out, from the second storage section, the playing-manner screen display data for the playing manner screen corresponding to the desired chord name and transmits the read-out playing-manner screen display data to the client terminal.

According to still another aspect of the present invention, there is provided a client terminal apparatus connectable with a server apparatus, which comprises: a display device; a reception section that receives basic screen display data for displaying a basic screen including a plurality of chord names, the display device displaying the basic screen indicating the plurality of chord names on the basis of the basic screen display data received by the reception section; and a control section. The control section performs control to: select, on the basis of an instruction by a user, a chord name from among the plurality of chord names indicated on the basic screen displayed on the display device; transmit, to the server apparatus, request information requesting a playing manner screen indicative of a model playing manner corresponding to the selected chord name; and receive playing-manner screen display data transmitted by the server apparatus in response to the request information for displaying the playing manner screen. In this client terminal apparatus, the display device displays, along with the basic screen, the playing manner screen indicative of the model playing manner corresponding to the selected chord name on the basis of the playing-manner screen display data received from the server apparatus.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Furthermore, the processor used in the present invention may comprise a dedicated processor with dedicated logic built in hardware as well as a computer or other general-purpose type processor capable of executing a desired software program.

While the described embodiments represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its embodiments will be described in greater detail hereinbelow with reference to the accompanying drawings, in which.

DETAILED DESCRIPTION OF EMBODIMENTS

Figure 1:
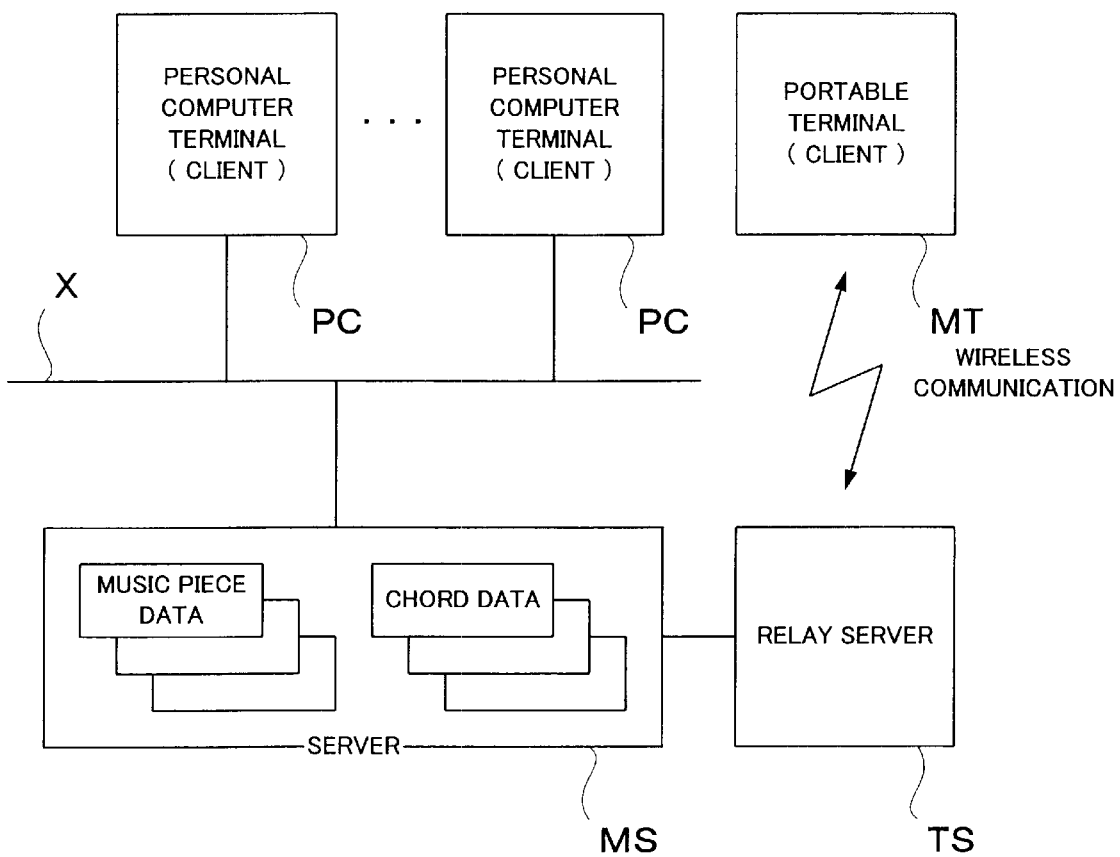
FIG. 1 is a system block diagram showing a general setup of an embodiment of a music performance assistance system, in which a music performance assistance apparatus of the present invention is incorporated in client terminals or servers.

FIG. 1 is a system block diagram showing a general setup of an embodiment of a music performance assistance system, in which a music performance assistance apparatus of the present invention is incorporated in client terminals or servers. The music performance assistance system of FIG. 1 is shown as being made up of one or more servers (only one shown in FIG. 1) MS, one or more relay servers (only one shown in FIG. 1) TS, a communication network X, and client terminals such as personal computer terminals PC and portable terminals (only one portable terminal shown in FIG. 1) MT. As will be later described in detail, each of the various components (i.e., servers MS, relay servers TS, personal computer terminals PC and portable terminals MT) constituting the music performance assistance system comprises an independent computer that includes a CPU, a ROM, a RAM, a communication interface, etc. Thus, each of the various system components can transmit or receive (communicate) various information and data, such as HTML files, URLs (Uniform Resource Locators and music piece data, via the communication network X such as the Internet or dedicated communication line. Namely, this music performance assistance system is a network system which, via the existing communication network X, allows any interested client terminal to selectively visit or read, using predetermined software programs such as a well-known network browser, some of a plurality of sites stored in the server MS and functioning to present various information and data in predetermined display styles, permits communication of music piece data between any one of the client terminals and the server MS.

The music performance assistance system may of course include other hardware components than the above-mentioned, but a description will be made hereinbelow in relation to a case where only minimum necessary resources are employed as illustrated in FIG. 1.

Each of the client terminals, such as the personal computer terminals PC and portable terminal MT, can access any one of the sites stored in the server MS in accordance with a user s access request (e.g., user s designation of an URL). For example, each of the sites stored in the server MS is managed as HTML (Hyper Text Markup Language) files, i.e. display information constituting bases of a plurality of Web pages described by an HTML program. The HTML files have attached thereto respective URLs indicative of their unique network addresses on the communication network X. For example, each of such URLs may be an Internet address to be used to designate one of the HTML files stored in the particular server MS, which is constructed as a predetermined row of textual information. Each of the client terminals can retrieve or read out any desired one of the HTML files from the server MS by designating the corresponding URL and display the site based on the read-out HTML file. The manner of displaying the site based on the HTML files are well known and thus will not be described here.

Further, each of the client terminals in the instant embodiment can carry out various processes. For example, each of the client terminals can carry out a process for receiving music piece data from the server MS to visually display, on its display device, a song book of a predetermined music piece on the basis of song book data included in the received music piece data; specifically, the song book is a music score indicating simultaneously lyrics progression and chord progression of the music piece in accordance with respective performance timing. The client terminal can also carry out a process for receiving music piece data from the server MS to reproduce a predetermined music piece on the basis of automatic performance data included in the received music piece data, and a process for receiving chord data from the server MS to visually display, on the display device, an appropriate manner of playing or manipulating a predetermined musical instrument to perform the chord (i.e., predetermined model instrument-playing manner for the chord) on the basis of the received chord data. Details of these processes carried out by the client terminal will be described later.

The server MS, constituting the music performance assistance system along with the client terminals, is a server computer that has prestored therein a multiplicity of site-related HTML files, music piece data sets, chord data sets, etc. for presentation to the client terminals and carries out various processes. For example, in response to an access request (e.g., URL designation) from any one of the client terminals, the server MS transmits one of the prestored HTML files corresponding to the access request. Also, the server MS transmits various other data, such as the prestored music piece data or chord data, in response to a request from any one of the client terminals. Namely, the server MS is connected with the client terminals via the communication network X, such as the Internet or dedicated communication line, or wireless communication in such a manner that it delivers a desired HTML file, music piece data, chord data, etc. in response to a request from any one of the client terminals. Each of the music piece data sets prestored in the server MS comprises song book data (specifically, HTMLs file describing contents to be display on the display device, such as lyrics and chord names, using an HTML program) for indicating lyrics progression and chord progression of a music piece in appropriate synchronism with each other, and automatic performance data of the music piece that are to be used as tone generation control information for the automatic performance and include, for example, event data, duration data and the like. Music piece data sets of a plurality of music pieces are prestored in the server MS. Further, each of the chord data sets prestored in the server MS is an HTML file indicative of an appropriate or model manner of performing a chord, such as a manner of using fingers or fingering on a string instrument; in the server MS, a plurality of the chord data sets are prestored in corresponding relation to a plurality of chord names, such as a C major chord and D minor.

The portable terminal MT used as the client terminal is a small-sized terminal, such as a mobile cellular phone or PDA (acronym for Personal Data (Digital) Assistant), which is capable of wireless communication. The portable terminal MT has a display function for displaying a site and a predetermined model instrument-playing manner for a chord, in addition to the principal communication function. Namely, as with the personal computer terminal PC, the portable terminal MT includes a predetermined display device for displaying any desired site containing various user-desired information and data. Note that when the portable terminal MT is connected to the server MS for bidirectional communication therebetween, the relay server TS must intervene. Namely, by the relay server TS relaying each signal to be communicated between the portable terminal MT and the server MS, the portable terminal MT can access the server MS.

It should also be understood that the client terminals in the inventive music performance assistance system may be of any type other than the above-mentioned personal computer terminal PC or portable terminal MT as long as they can obtain and then process an HTML file, music piece data, chord data etc. from the server MS. It should also be obvious that two or more client terminals and servers may be connected to the communication network X. Further, although the instant embodiment is described herein in relation to the case where a site is displayed on the basis of HTML files, it should be apparent that a site may be displayed on the basis of any other similar files, such as those using the well-known Java language.

As stated above, the server MS and each of the client terminals may be interconnected via any of various communication networks such as a LAN (Local Area Network) and the Internet, or through wireless communication. Thus, by connecting the client terminal to the communication network X for bidirectional communication between the client terminal and the server MS, the user can access or view any desired one of the sites stored in the server MS, fetch various desired data from the server MS to the client terminal, and so on.

Figure 2:
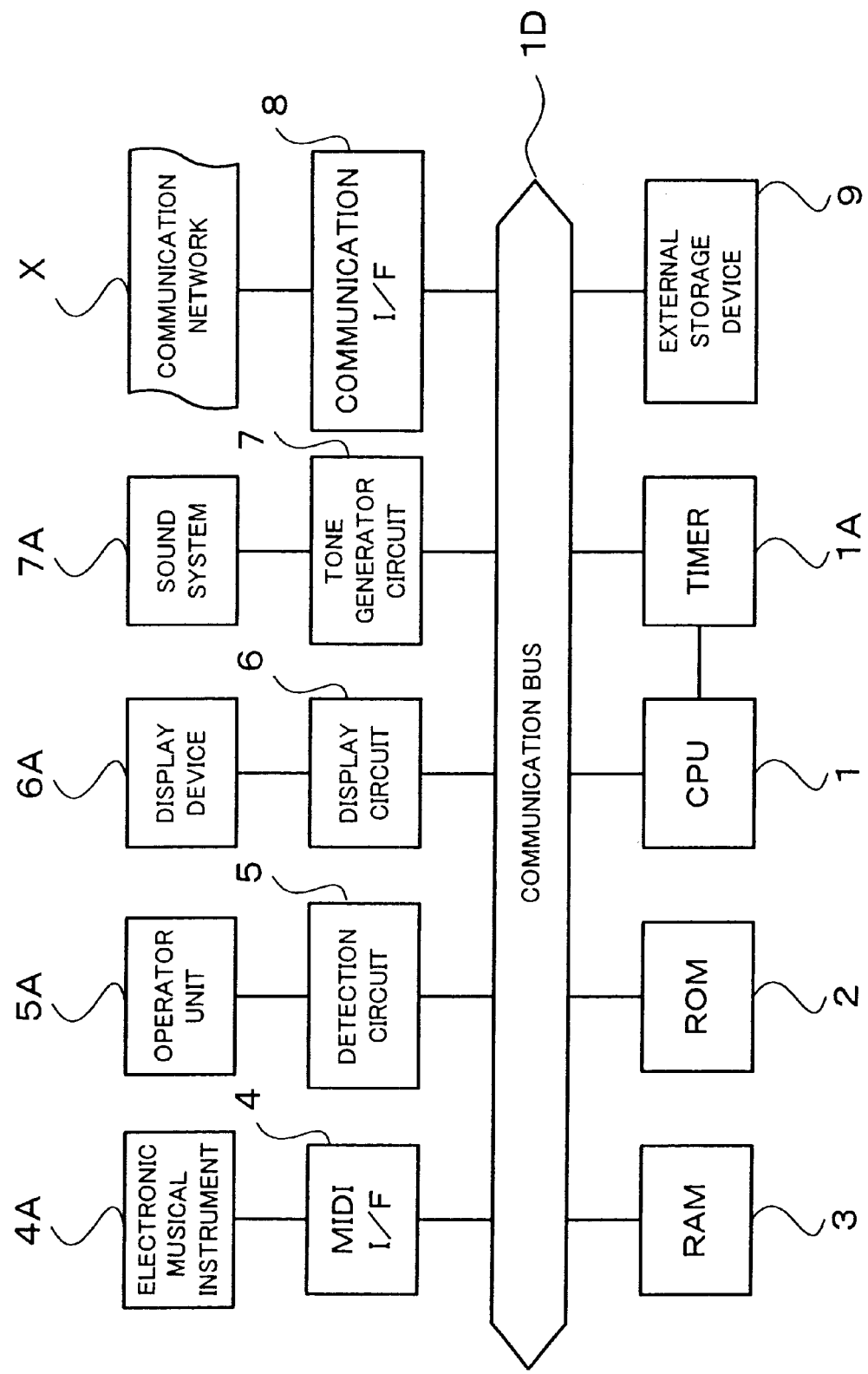
FIG. 2 is a hardware block diagram explanatory of an exemplary general setup of each of the client terminals and server in the music performance assistance system of FIG. 1.

With reference to FIG. 2, the following paragraphs describe an exemplary hardware setup of one of the personal computer terminal PC, portable terminal MT, server MS and relay server TS. Namely, because these personal computer terminal PC, portable terminal MT, server MS and relay server TS are similar in construction to each other, the hardware setup of only the personal computer terminal PC will be described representatively.

In the instant embodiment, the personal computer terminal PC is controlled by a microcomputer that includes a microprocessor unit (CPU) 1, a read-only memory (ROM) 2 and a random access memory (RAM) 3. The CPU 1 controls operation of all components in the terminal PC. To the CPU 1 are connected, via a data and address bus 1D, the read-only memory 2, random-access memory 3, MIDI interface 4, operation detection circuit 5, display circuit 6, tone generator (T.G.) circuit 7, communication interface 8 and external storage device 9. Also connected to the CPU 1 is a timer 1A for counting various time periods and signaling predetermined interrupt timing for timer interrupt processes to be carried out by the CPU 1. Namely, the timer 1A generates tempo clock pulses for counting various time intervals and setting a tempo at which a music piece is to be automatically performed. Frequency of the tempo clock pulses is adjustable via an operator unit 5A including various switches, operators, etc. Such tempo clock pulses generated by the timer 1A are given to the CPU 1 as processing timing instructions or as interrupt instructions. The CPU 1 carries out various processes in accordance with various instructions entered via the operator unit 5A (i.e., switch manipulation information).

The various processes carried out by the CPU 1 in the instant embodiment include main processing for displaying a "music score screen", a model instrument-playing manner display process for displaying a "chord screen", etc. Details of these main processing, model instrument-playing manner display process, etc. will be given later.

The ROM 2 prestores therein various information including various programs to be executed by the CPU 1 and sets of music piece data and chord data. The RAM 3, which is used for storing various information such as an HTML file, music piece data (including song book data and automatic performance data) and chord data received from the server MS and the like, is used as a working memory for temporarily storing various data occurring as the CPU 1 carries out a program, as well as a memory for storing a currently-executed program and data related to the currently-executed program. Further, predetermined address regions of the RAM 3 are used as registers, flags, tables, memories, etc. necessary for implementation of various functions of the instant embodiment. For example, music piece data and chord data received from the server MS may be temporarily stored in the RAM 3 upon receipt, and then may be transferred to the external storage device 9 or the like for storage therein.

The MIDI interface (I/F) 4 is designed to input MIDI-standard tone information (MIDI data) from an electronic musical instrument 4A to the personal computer terminal PC or outputting MIDI-standard tone information (MIDI data) from the personal computer terminal PC to the electronic musical instrument 4A or the like. Note that the electronic musical instrument 4A may be of any type, such as a keyboard type, string instrument type, wind instrument type, percussion instrument type or type attachable to a human body, as long as it can generate MIDI data in response to manipulations by a user or player. Also note that the MIDI interface (I/F) 4 may be a general-purpose interface rather than a dedicated MIDI interface, such as RS-232C, USB (acronym for Universal Serial Bus) or EEE1394, in which case other data than MIDI event data may be communicated at the same time. In the case where a general-purpose interface as mentioned above is used as the MIDI interface 4, the electronic musical instrument 4A can transmit/receive other data than the MIDI event data. Namely, the data format of the tone information may be any other appropriate format than the MIDI format, in which case the MIDI interface 4 and electronic musical instrument 4A are to be arranged to fit the data format used.

The operator unit 5A includes various types of operators, such as a point-and-click device like a mouse, keyboard, special switches and other operators connected to the body of the terminal PC. Among such operators may be a ten-button keypad for inputting numerical value data, keyboard for inputting text data, and panel switches. The operation detection circuit 5 constantly detects respective operational states of the individual operators on the operator unit 5A and outputs switch information, corresponding to the detected operational states of the operators, to the CPU 1 via the communication bus (e.g., data and address bus) 1D. The display circuit 6 visually displays various screens and controlling conditions of the CPU 1 on a display device 6A that may be in the form of an LCD (Liquid Crystal Device) or CRT (Cathode Ray Tube). The various screens include a "music score screen" created using music piece data received from the server MS, "chord screen" created using chord data received from the server MS, etc.

The tone generator (T.G.) circuit 7, which is capable of simultaneously generating tone signals in a plurality of channels, receives automatic performance data supplied via the communication bus (e.g., data and address bus) 1D and generates tone signals based on these received automatic performance data. Each of the tone signals thus generated by the tone generator circuit 7 is audibly reproduced or sounded by a sound system 7A including one or more amplifiers and speakers. If the automatic performance data received from the server MS are of the MIDI format, these data are transferred to the tone generator circuit 7 or MIDI interface 4 and then reproduced (i.e., automatically performed) thereby. If the automatic performance data received from the server MS are audio data, these data are transferred to the sound system 7A or external reproduction device (not shown) and then reproduced thereby. The automatic performance data may be in a digitally-coded data format such as the MIDI format or in a waveform sample data format such as the PCM, DPCM or ADPCM format. The tone generator circuit 7 and sound system 7A may be constructed in any desired conventionally-known manner.

Further, the communication interface (I/F) 8 is an interface connected to the communication network X, such as a LAN, the Internet or telephone line network, via which it may be connected, for example, to the sever MS so as to transmit any of various data requesting commands from the client terminal to the server MS or input an HTML file, music piece data and chord data from the server MS to the client. Thus, in a situation where a particular HTML file and music piece data to be reproduced are not contained in the ROM 2, the external storage device (e.g., hard disk) 9 or the like of the personal computer terminal PC, such an HTML file, music piece data, chord data, etc. can be downloaded from the server MS via the communication interface 8. In such a case, the personal computer terminal PC, which is a "client terminal", sends, via the communication interface 8 and communication network X, a data-requesting command to request the server MS to download the HTML file, music piece data, chord data, etc. In response to the command from the personal computer terminal PC, the server MS delivers the requested HTML file, music piece data, chord data, etc. to the personal computer terminal PC via the communication network X. The personal computer terminal PC receives these HTML files to thereby display a site based on the received HTML files and/or cumulatively stores the music piece data, chord data, etc. into the external storage device (e.g., hard disk) 9. Note that the communication interface 8 and communication network X may be of either a wired type or a wireless type; in an alternative, wired- and wireless-type communication interfaces 8 and communication networks X may be provided.

The external storage device 9 is provided for storing HTML files, music piece data, chord data and data pertaining to control of various program to be executed by the CPU 1. Where a desired control program is not prestored in the ROM 2, the desired control program may be prestored in the external storage device (e.g., hard disk device) 9, so that, by reading the desired control program from the external storage device 9 into the RAM 3, the CPU 1 is allowed to operate in exactly the same way as in the case where the desired control program is stored in the program memory 2. This arrangement greatly facilitates version upgrade of the control program, addition of a new control program, etc. Note that the external storage device 9 may comprise any one or more of various removable-type media other than the hard disk (HD), such as a floppy disk (FD), compact disk (CD-ROM or CD-RAM), magneto-optical disk (MO), digital versatile disk (DVD) and semiconductor memory.

Further, in the case of the portable terminal MT, the operator unit 5A includes various switches and operators provided on (or within) the body of the terminal MT, and the display device 6A may be in the form of an LCD or the like provided on (or within) the body of the terminal MT. It is preferable that the tone generator circuit 7 and sound system 7A (e.g., one or more amplifiers and speakers) be provided on (or within) the body of the terminal MT. Further, the communication interface 8 in the portable terminal MT is designed for wireless communication, which can communicate with the relay server TS. Of course, the portable terminal MT may also include an interface for wired communication in a similar manner to the personal computer terminal PC. The external storage device 9 may be incorporated previously within the body of the portable terminal MT, or may be provided separately from or externally to the body of the terminal MT for connection to the portable terminal body via a cable or the like whenever necessary. In the case where the external storage device 9 is incorporated within the body of the terminal MT, the external storage device 9 is preferably in the form of a small-sized semiconductor memory. In the case where the external storage device 9 is provided separately or externally to the body of the terminal MT, it may be in the form of any one or combination of a hard disk (HD), floppy disk (FD), compact disk (CD-ROM or CD-RAM), magneto-optical disk (MO), digital versatile disk (DVD), etc., as stated above.

It should be appreciated that the client terminals, such as the personal computer and portable terminals PC and MT, server MS and the like in the instant embodiment are not limited to the type where the operator unit 5A, display device 6A, tone generator circuit 7, etc. are incorporated together within the apparatus body, and may be of another type where the operator unit, display device, tone generator circuit, etc. are provided separately from each other but can be connected with each other via MIDI interfaces and communication facilities such as a communication network. Further, the client terminal may be an automatic performance apparatus such as a karaoke apparatus, player piano or electronic musical instrument itself without being limited to the personal computer terminal PC or portable terminal MT as described above. Further, either or both of the server MS and relay server TS need not necessarily be provided with the MIDI interface 4, electronic musical instrument 4A, tone generator circuit 7 and sound system 7A.

Figure 3:
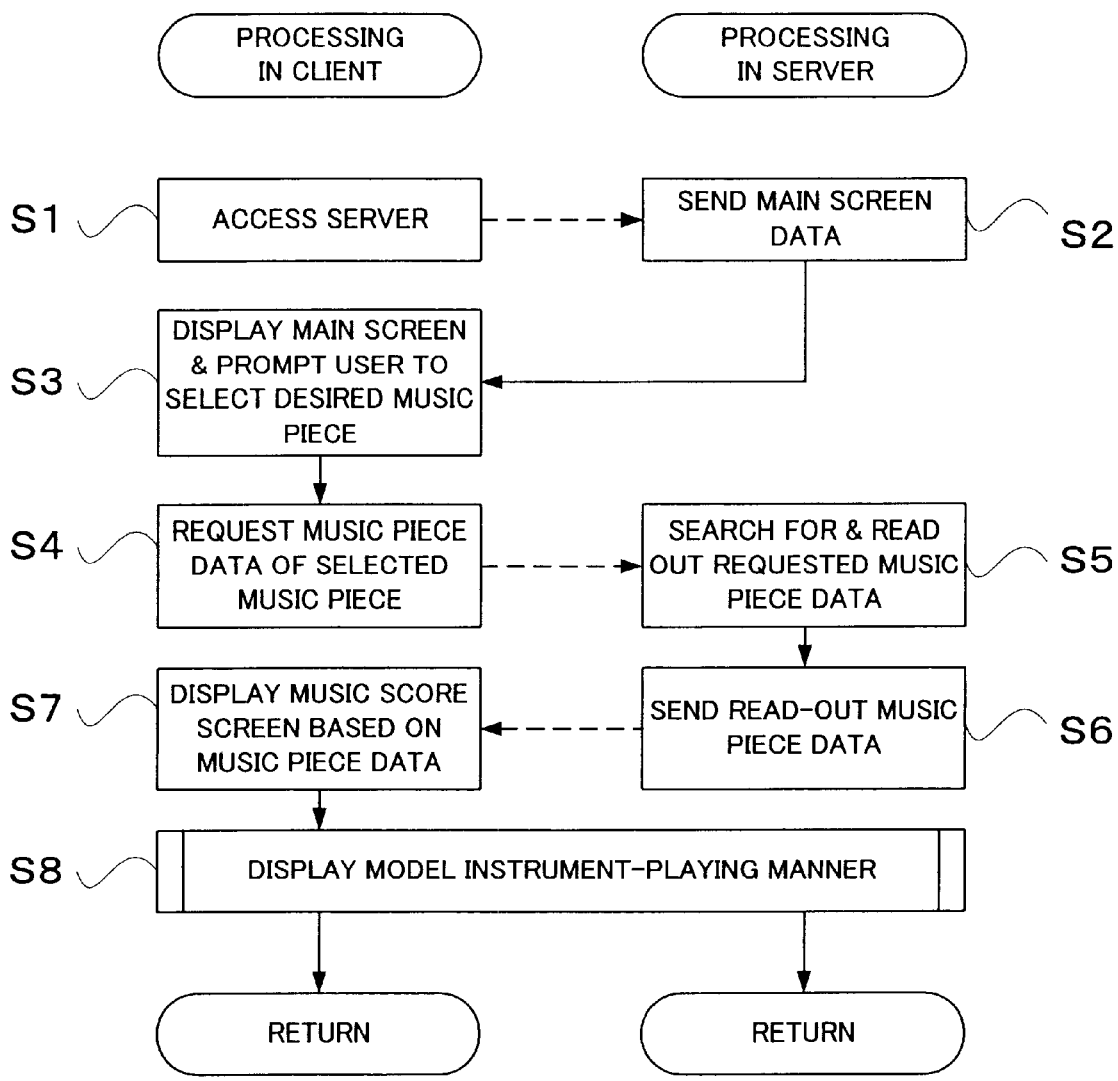
FIG. 3 is a flow chart showing an example of main processing carried out between the client terminal and the server in the music performance assistance system shown in FIG. 1.

FIG. 3 is a flow chart showing an example of main processing carried out between the client terminal and the server MS in the music performance assistance system shown in FIG. 1. In this main processing, various processes are executed between the client terminal and the server MS, which include ones for displaying a site and model instrument-playing manner for a designated chord.

First, at step SI of FIG. 3, the client terminal sends a site access request to the server MS storing a user-desired site (e.g., music site). In response to the site access request from the client terminal, the server MS reads out an HTML file for creating a main screen (not shown) of the requested site, and returns the main-screen creating HTML file to the client terminal, at step S2. Then, at step S3, the client terminal displays the main screen of the user-desired site on the basis of the main-screen creating HTML file received from the server MS, and thereby prompts the user to select a desired music piece from the displayed main screen. Namely, the client terminal can access the predetermined server MS on the communication network X (such as the Internet) using a URL or the like, and read out the user-desired site from among a plurality of sites stored in the server MS. Thus, the client terminal is connected to the communication network X to thereby shift from an offline state (i.e., a state not connected to the communication network X) to an online state (i.e., a state connected to the communication network X), so that the main screen of the user-desired site is displayed. In the instant embodiment, the main screen of the site shows a listing of names (or file names) of a plurality of music pieces. By the user selectively designating the name of a desired music piece on the main screen, data of the user-desired music piece (i.e., music piece data) can be read out from the server MS.

Figure 4:
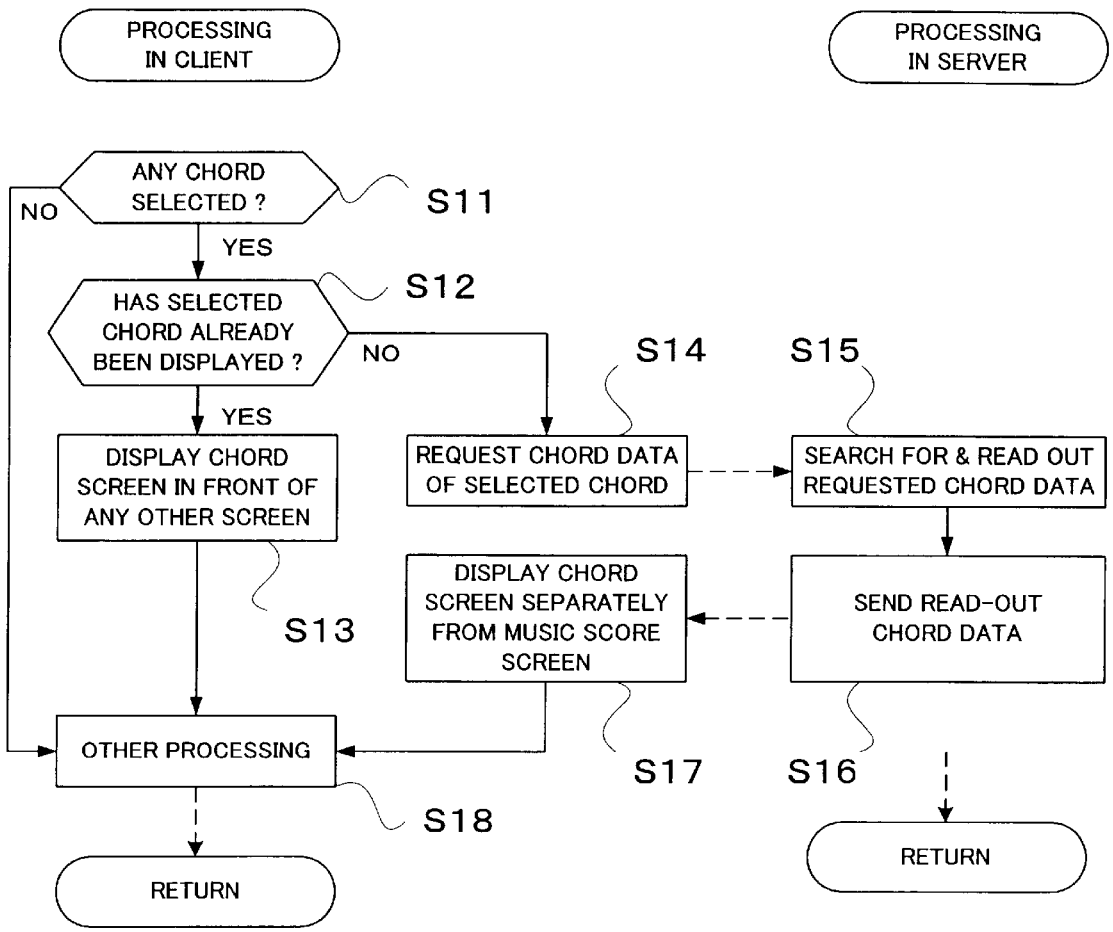
FIG. 4 is a flow chart showing an exemplary step sequence of a model instrument-playing manner display process shown in FIG. 3.
Figure 5:
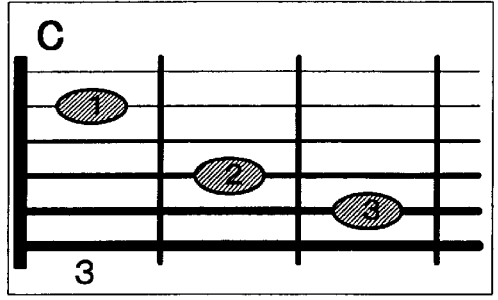
FIG. 5 is a conceptual diagram showing examples of a music score screen and a chord screen displayed on a display device.
Figure 5:
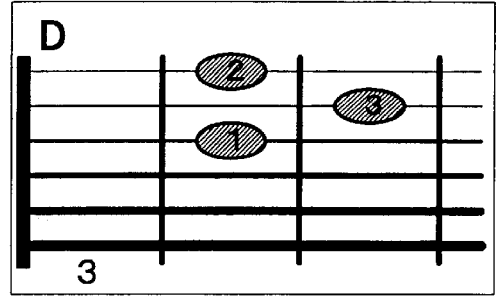
Figure 5:
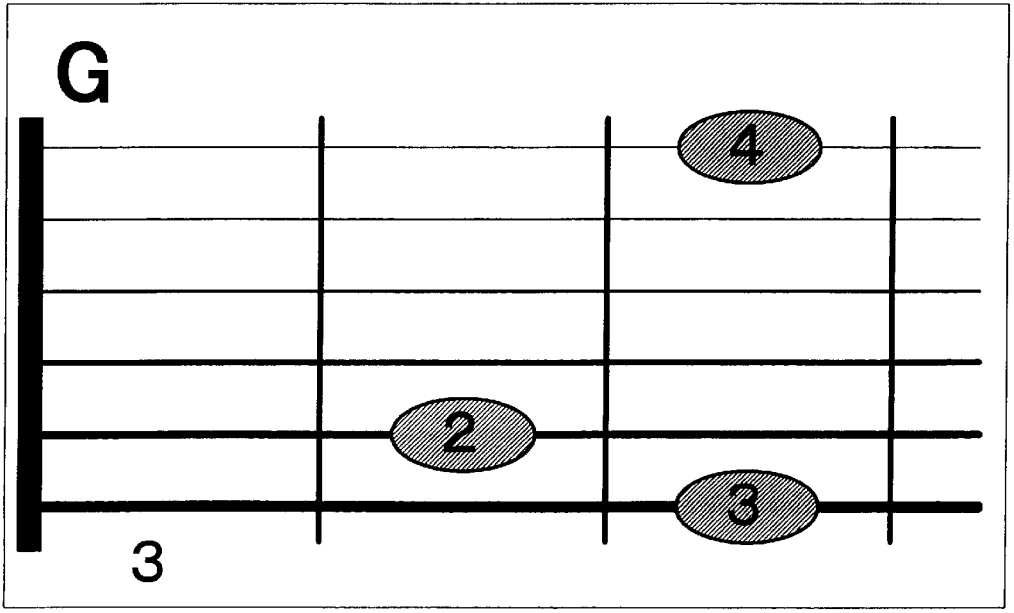

In response to the user's selection (e.g., designation of the name) of the desired music piece, the client terminal requests the server MS to read out the music piece data of the user-desired music piece, at step S4. Then, the server MS searches for and reads out the requested music piece data at step S5, and sends the read-out music piece data to the client terminal at step S6. In thus sending the music piece data to the client terminal, the server MS also sends window display control data in addition to the music piece data. Then, on the basis of the music piece data and window display control data sent from the server MS, the client terminal displays a music score screen (to be later described in relation to FIG. 5) on a predetermined position of the display device in a predetermined size and in a predetermined display format (e.g., in a window format), at step S7. Then, in response to predetermined operation by the user, the client terminal carries out a model instrument-playing manner display process at step S8, as will be later described in relation to FIG. 4. This model instrument-playing manner display process is executed between the client terminal and the server MS, in accordance with which a chord screen of FIG. 5 is displayed on the client terminal as will be later described. Namely, the screen display in the client terminal is switched from the main screen to the music score screen as the music piece data imparted with the user-selected music piece name (or file name) are read out from the external storage device 9 or the like of the server MS. In the instant embodiment, the music score screen shows a song book; i.e., the music score screen simultaneously shows lyrics progression and chord progression of the music piece in accordance with predetermined performance timing. Then, by the user designating one or more desired chords from among chords displayed on the music score screen, the model instrument-playing manner can be displayed on the chord screen for each of the designated chords. Details of the music score screen and chord screen will be described later in relation to FIG. 5.

This and following paragraphs describe the model instrument-playing manner display process executed at step S8 of the main processing shown in FIG. 3. FIG. 4 is a flow chart showing an exemplary step sequence of the model instrument-playing manner display process. This instrument-playing manner display process is carried out between the server MS and the client in response to predetermined operation performed by the user using the music score screen displayed in the above-described manner. Specifically, the model instrument-playing manner display process is executed repeatedly after the display of the music score screen is initiated until termination of the display of the music score screen is instructed.

First, at step S11 of the model instrument-playing manner display process, a determination is made in the client terminal as to whether any chord has been selected by the user, i.e. whether the user has performed predetermined input operation that is considered to be chord selection operation. For example, the chord selection operation is performed by the user mouse-clicking a desired one of chord names displayed along with the lyrics on the music score screen, or by the user directing inputting a desired chord name. If no chord has been selected by the user (NO determination at step S11), the process jumps to step S18 in order to execute other processing. Namely, if no chord has been selected, there is no need for the client terminal to receive chord data from by the server MS and display a chord screen based on the chord data, and thus in this case, operations are carried out only in the client terminal with no operation having to be carried out in the server MS; this is why the process jumps to step S18. If, on the other hand, a particular chord has been selected by the user (YES determination at step S11), it is further determined at step S12 whether the user-selected chord is among chords having already been displayed on the display device, i.e. whether or not the chord screen of the user-selected chord has already been displayed (and is still currently displayed) on the display device. If answered in the affirmative (YES determination at step S12), the chord screen of the user-selected chord is displayed in front of any other displayed screen, at step S13. That is, in case a plurality of other chords have already been selected for the music piece in question, the respective chord screens of these selected chords perhaps have already been displayed in an overlapping manner, in which case one or some of the displayed chord screens may be invisible to the user due to the overlap. In such a case, even when the chord selected at step S12 above is determined as having already been displayed, as the chord screen on the display device, the user can not readily ascertain, from the overlapping screen display, where the chord screen of the current selected chord is being displayed. For this reason, the chord screen of the current selected chord is caused to pop up in front of the chord screens of any other chords as well as the music score screen, so as to enhance the visibility or viewability of the chord screen of the current selected chord. Further, the chord screen or screens, namely a playing manner screen, on the display device 6A may be displayed in a predetermined highlighted fashion while the music score screen on the display device 6A is displayed in a normal fashion.

If, on the other hand, the user-selected chord has not yet been displayed as the chord screen on the display device (NO determination at step S12), the client terminal, at step S14, requests the chord data of the selected chord from the server MS. Then, the server MS searches for and reads out the requested chord data at step S15, and then sends the read-out chord data to the client terminal at step S16. Namely, the external storage device 9 or the like of the server MS has prestored, in association with a multiplicity of chord names, a multiplicity of sets of chord data for creating chord screens indicative of model instrument-playing manners of the corresponding chords, and once the user of the client terminal selects, from the music score screen, a desired chord for which the user wants a model instrument-playing manner displayed, the server MS searches for the chord data of the desired chord and sends the chord data to the client terminal. Where the chord data sets are prestored as a database in the external storage device 9 or the like of the server MS, these chord data sets may be imparted with respective predetermined identification data (or data indicative of file names identical to or similar to their chord names) so that they are searched in accordance with the identification data or file names. For example, where the identification data corresponding to the chord names are prepared in the client terminal, the client terminal transmits these identification data to the server MS, and requests the server MS to search the chord data sets in accordance with the transmitted identification data, at step S14 above. Conversely, where the identification data corresponding to the chord names are prepared in the server MS, the client terminal transmits the selected chord name itself to the server MS, and requests the server MS to obtain the identification data corresponding to the selected chord name and then search for the chord data set in accordance with the identification data, at step S14. Further, when the chord data of the selected chord name are sent to the client terminal, corresponding window display control data are sent in addition to the chord data.

Then, once the client terminal receives the chord data and window display control data sent from the server MS, the client terminal displays the chord screen, separate from the music score screen, on a predetermined position of the display device in a predetermined size and in a predetermined display format (e.g., in a window format), at step S17. Namely, the client terminal creates the chord screen on the basis of the chord data and corresponding window display control data received from the server MS, and displays the thus-created chord screen on a predetermined position of the display device in a predetermined size separately from the music score screen and the chord screen of any other chord. In this way, on the display device of the client terminal, there are simultaneously displayed a plurality of chord screens, in addition to the music score screen, in accordance with the number of the chords selected by the user, so that the user is allowed to practice performing the plurality of chords on the musical instrument while viewing the displayed chord screens.

At step S18, other processing is carried out, which includes, for example, a process for instructing termination of the model instrument-playing manner display process (i.e., an operation for instructing termination of the display of the music score screen), a scroll process for scrolling the music score screen in a vertical (up-and-down) or horizontal (left-and-right) direction, a screen display control process for changing the size or position, on the display device, of a desired one of the displayed screens (windows) such as the music score screen and chord screens, and an automatic performance starting/ending process for instructing reproduction of the music piece based on automatic performance data.

The following paragraphs describe the details of the music score screen and chord screen displayed on the display device of the client terminal, with reference to FIG. 5. FIG. 5 is a conceptual diagram showing examples of the music score screen and chord screen that are created on the basis of the music piece data and chord data sent from the server MS in response to client s requests (see step S7 of FIG. 3 and step S17 of FIG. 4).

As stated above, the music score screen shown in section (a) of FIG. 5 is a screen displayed on the basis of music piece data sent from the server MS in response to a client's request (steps S4–S7 of FIG. 3). As shown, on the music score screen, there are indicated the lyrics and chords of the music piece for which the user wants to learn to play a predetermined musical instrument. The "lyrics" are indicated on the music score screen on the basis of the song book data included in the music piece data, and the "chords" represent the names of the chords to be used in a performance of the music piece based on the song book data and automatic performance data that are included in the music piece data. The chord names are each indicated at a position adjacent to the words that are to be performed using the chord; namely, the displayed position of each of the chords indicates performance timing of the chord to be used for performing the corresponding words. In the illustrated example of section (a) of FIG. 5, the chords to be used for performing a phrase "anatani sayounaraierunowa kyodake" on the second row of the music score screen comprise five types of chords: Em (E minor chord); B7 (B seventh chord); G (G major chord); D (D major chord); and C (C major chord), and these chords are performed in order of "Em, B7, Em, G, D, G, Em, C, D and G" in accordance with performance progression of the music piece. More specifically, the chords to be performed for the words "anata" and "ni" are "Em" and "B7", respectively, the chords to be performed for the words "sayo", "unara", "tte", "ieruno" and "wa" are "Em", "G", "D", "G" and "Em", respectively, the chords to be performed for the words "kyo" and "dake" are "C" and "D", respectively, and the chord to be performed for a no-word segment following the words "dake" is "G".

The music score screen in the above-described embodiment can indicate the words of only a portion of the music piece, and the words capable of being indicated on the music score screen at one time can be changed as desired through a scroll process in response to user operation or a scroll process automatically executed in accordance with progression of the automatic performance of the music piece. However, all the words of the entire music piece may be displayed together on the screen, instead of the words of only a portion of the music piece being displayed at one time as mentioned above. Further, although the lyrics are indicated in Japanese in the illustrated example, the lyrics may of course be in any other desired language, such as English, French, German, Italian or Chinese.

This and following paragraphs describe the chord screen. As already stated, the chord screen is created on the basis of chord data sent from the server MS in response to a client's request (see steps S14–S17 of FIG. 4). Namely, by the user performing predetermined operation, e.g. mouse-clicking one of the chord names indicated on the music score screen (in the illustrated example of section (a) FIG. 5, the chord "D" is pointed to by an arrow-shaped mouse pointer), a chord screen indicative of an appropriate manner of performing the mouse-clicked chord (i.e., model instrument-playing manner for the mouse-clicked chord) is displayed on the display device separately from the music score screen. FIG. 5 shows a case where chord screens corresponding to the "C", "D" and "G" chords are displayed on the client's display device and the musical instrument the user wants to learn playing, i.e. for which the user wants a model instrument-playing manner displayed, is a guitar.

As seen from "Chord Screen 1", "Chord Screen 2" and "Chord Screen 3" shown on middle and bottom rows of FIG. 5 (sections (b), (c) and (d) of FIG. 5), each of the chord screens indicates an appropriate or model manner of performing the designated chord on the musical instrument. Specifically, in FIG. 5, "Chord Screen 1" is a screen displayed when the "C" chord is clicked by the user on the music score screen, "Chord Screen 2" is a screen displayed when the "D" chord is clicked by the user on the music score screen, and "Chord Screen 3" is a screen displayed when the "G" chord is clicked by the user on the music score screen. Note, however, that "Chord Screen 3" is a screen displayed as a result of enlarging and moving, in response to predetermined user operation, a predetermined initial screen (that is displayed with the same size and in the same position as "Chord Screen 1"). Namely, in the instant embodiment, the user is capable of enlarging or contracting each displayed chord screen into a desired size and moving the displayed chord screen to a desired position on the display device.

In the illustrated example of FIG. 5, each of the chord screens visually shows an appropriate or model manner of performing the designated chord on the guitar, and some of the frets on the neck of the guitar are indicated on each of the chord screens. On each of the chord screens illustrated in sections (b), (c) and (d) FIG. 5, there are indicated respective positions of strings to be depressed for performing the designated chord and fingers to be used to depress these strings. Each of the chord screens illustrated in FIG. 5 is designed to simultaneously indicate the strings and fingers in a single display style. Namely, hatched ovals indicate the positions of the strings while numbers put within the hatched ovals indicate the fingers to be used to depress the strings; namely, number "1" represents the index finger, "2" represents the middle finger, "3" represents the ring finger, and "4" represents the little finger. For example, by merely viewing "Chord Screen 1", the user can readily see that the "C" chord can be appropriately performed on the guitar by depressing the second string of the third fret with the index finger, depressing the fourth string of the fourth fret with the middle finger and depressing the fifth string of the fifth fret with the ring finger. Similarly, the user can readily know how to appropriately perform the "D" chord by merely viewing "Chord Screen 2", and know appropriately how to perform the "G" chord by merely viewing "Chord Screen 3". Further, as necessary, the user can cause a plurality of such chord screens to be simultaneously displayed as shown in FIG. 5, through simple operation. If a plurality of chord screens are displayed in advance for a plurality of chords which the user wants to know the model instrument-playing manners, it is only necessary for the user to refer to the displayed chord screens for the purpose of ascertaining the model instrument-playing manners, and thus the model instrument-playing manners for two or more chords can be ascertained promptly.

The above-described functions may of course be implemented by a single music performance assistance apparatus alone, without using in real time a network system as described above in relation to the embodiment. For example, in the above-described music performance assistance system, the client terminal may receive music piece data and various chord data from the server MS and store them in memory in advance so that the above-described functions can be performed on the basis of the thus-stored data only through operations of the client terminal. Further, when the user uses the client terminal to access the server MS on the communication network X so that user-desired information can be supplied from the server MS to the client terminal, a billing process may be carried out in accordance with the nature of the supplied data. For example, arrangements may be made such that, when the user wants to play a musical instrument for a desired music piece, the user can access a predetermined music site (i.e., music piece data selling site) having prestored therein the music piece data of the music piece and thereby acquire (i.e., purchase) the music piece data from the music site (music piece data selling site) for payment. In another embodiment, the music performance assistance apparatus may be implemented singly by the user's computer. In such a case, it is assumed that the screen data necessary for the basic screen and model instrument-playing manner display screens for various chords are prestored in a memory belonging to the user's computer.

It should be appreciated that the present invention is not limited to the arrangement that chord data of a desired chord are transmitted from the server MS to the client terminal each time a user-desired chord is selected; for example, chord data of all chords stored in the server MS may be transmitted collectively from the server MS to the client terminal in response to access of the client terminal to the server MS. However, in such a case, even chord data that are not actually used by the user are supplied to the client terminal and a longer time is required at an initial stage for transmission and reception of the chord data. Therefore, the scheme of transmitting chord data from the server MS to the client terminal each time a user-desired chord is selected is more preferable because it achieves a higher processing efficiency.

Further, the chord data transmitted from the server MS to the client terminal as a portion of the music piece data may be any desired type of data, such as picture data indicative of a to-be-displayed picture itself (e.g., bit map data or JPEG data) or display control data indicative of how to control a display of a basic picture (e.g., a picture of the guitar neck) as long as the chord data can indicate, with sufficient viewability, a model instrument-playing manner to the user.

It should also be appreciated that the automatic performance data to be transmitted from the server to the client terminal as a portion of the music piece data may be in any desired format, such as: the "event plus absolute time" format where the time of occurrence of each performance event is represented by an absolute time within the music piece or a measure thereof; the "event plus relative time" format where the time of occurrence of each performance event is represented by a time length from the immediately preceding event; the "pitch (rest) plus note length" format where each performance data is represented by a pitch and length of a note or a rest and a length of the rest; or the "solid" format where a memory region is reserved for each minimum resolution of a performance and each performance event is stored in one of the memory regions that corresponds to the time of occurrence of the performance event. Furthermore, where automatic performance data sets for a plurality of channels are handled in the present invention, the automatic performance data for the plurality of channels may be stored together in a mixture or separately from each other on a track-by-track basis.

In summary, with the present invention arranged in the above-described manner, the user can cause a plurality of chord screens, indicating respective model instrument-playing manners for a plurality of chords, to be simultaneously displayed, through simple operation. Also, by displaying a plurality of chord screens in advance only for chords which the user wants to view the model instrument-playing manners, the present invention allows the user to promptly ascertain the model instrument-playing manner for each of the chords during playing of the musical instrument.

The present invention relates to the subject matter of Japanese Patent Application No. 2001-084961 filed on Mar. 23, 2001, the disclosure of which is expressly incorporated herein by reference in its entirety.

What is claimed is:

1. A music performance assistance apparatus comprising:
   a display device;
   a supply device that supplies said display device with basic screen display data for displaying a basic screen including a plurality of chord names to be indicated on the basic screen, said display device displaying said basic screen indicating the plurality of chord names on the basis of the basic screen display data supplied by said supply device;
   a storage device that stores, for each chord, playing-manner screen display data for displaying a playing manner screen indicative of a model playing manner corresponding to the chord; and
   a processor coupled with said display device and said storage device and adapted to:
      select a chord name from among the plurality of chord names indicated on the basic screen displayed on said display device, on the basis of an instruction by a user; and
      read out, from said storage device, the playing-manner screen display data corresponding to the selected chord name,
   wherein said display device displays, along with the basic screen, a playing manner screen indicative of a model playing manner corresponding to the selected chord name on the basis of the playing-manner screen display data read out from said storage device.

2. A music performance assistance apparatus as claimed in claim 1 wherein said display device can simultaneously display a plurality of playing manner screens.

3. A music performance assistance apparatus as claimed in claim 1 wherein said display device displays the playing manner screen in a highlighted fashion.

4. A music performance assistance apparatus as claimed in claim 1 wherein said processor is further adapted to:
   when, during display, on said display device, of the basic screen and at least a first playing manner screen corresponding to a first chord name, a second chord name has been selected in response to an instruction by the user, determine whether a second playing manner screen corresponding to said second chord name is currently displayed on said display device; and
   read out, from said storage device, the playing-manner screen display data corresponding to said second chord name if said second playing manner screen has not yet been displayed on said display device,
   wherein said display device displays, along with the basic screen and at least said first playing manner screen, said second playing manner screen corresponding to said second chord name on the basis of the playing-manner screen display data read out from said storage device.

5. A music performance assistance apparatus as claimed in claim 1 wherein said processor is further adapted to select a music piece on the basis of an instruction by the user, and wherein the basic screen supplied by said supply device lists names of chords used in the selected music piece in accordance with progression of the selected music piece.

6. A music performance assistance apparatus as claimed in claim 1 wherein the model playing manner represents how to operate strings of a guitar.

7. A server apparatus connectable with a client terminal, said server apparatus comprising:
   a first storage section that stores basic screen display data for allowing said client terminal to display a basic screen including a plurality of chord names;

a transmission section that transmits the basic screen display data to said client terminal;

a second storage section that stores, for each chord, playing-manner screen display data for displaying a playing manner screen indicative of a model playing manner corresponding to the chord;

a reception section that receives, from said client terminal, request information requesting the playing manner screen corresponding to a desired one of the plurality of chord names included in the basic screen; and a control section that, in response to the request information received by said reception section, reads out, from said second storage section, the playing-manner screen display data for the playing manner screen corresponding to the desired chord name and transmits the read-out playing-manner screen display data to said client terminal.

8. A client terminal apparatus connectable with a server apparatus, said client terminal apparatus comprising:

a display device;

a reception section that receives basic screen display data for displaying a basic screen including a plurality of chord names, said display device displaying the basic screen indicating the plurality of chord names on the basis of the basic screen display data received by said reception section; and a control section that performs control to: select, on the basis of an instruction by a user, a chord name from among the plurality of chord names indicated on the basic screen displayed on said display device; transmit, to said server apparatus, request information requesting a playing manner screen indicative of a model playing manner corresponding to the selected chord name; and receive playing-manner screen display data transmitted by said server apparatus in response to the request information for displaying the playing manner screen, wherein said display device displays, along with the basic screen, the playing manner screen indicative of the model playing manner corresponding to the selected chord name on the basis of the playing-manner screen display data received from said server apparatus.

9. A client terminal apparatus as claimed in claim 8 wherein said display device can simultaneously display a plurality of playing manner screens.

10. A client terminal apparatus as claimed in claim 8 wherein said control section detects that the playing manner screen is currently displayed on said display device, in response to which detection said control section causes said display device to display the playing manner screen in a highlighted fashion.

11. A client terminal apparatus as claimed in claim 8 wherein when, during display, on said display device, of the basic screen and at least a first playing manner screen corresponding to a first chord name, a second chord name has been selected in response to an instruction by the user, said control section determines whether a second playing manner screen corresponding to said second chord name is currently displayed on said display device, and if said second chord name has not yet been displayed on said display device, said control section performs control to transmit, to said server apparatus, request information requesting the playing manner screen corresponding to said second chord name and receive the playing-manner screen display data for displaying the playing manner screen corresponding to said second chord name transmitted by said server apparatus in response to the request information, and wherein said display device displays, along with the basic screen and at least said first playing manner screen, said second playing manner screen corresponding to said second chord name on the basis of the playing-manner screen display data received from said server apparatus.

12. A client terminal apparatus as claimed in claim 8 which further comprises a selector that selects a music piece on the basis of an instruction by a user, and wherein the basic screen lists names of chords used in the selected music piece in accordance with progression of the selected music piece.

13. A client terminal apparatus as claimed in claim 8 wherein the model playing manner represents how to operate strings of a guitar.

14. A computer program comprising computer program code means for performing all steps of a music performance assistance method when said program is run on a computer, said music performance assistance method the steps of:

displaying, on a display device, a basic screen indicating a plurality of chord names;

selecting a chord name from among the plurality of chord names indicated on the basic screen displayed on said display device, on the basis of an instruction by a user;

reading out playing-manner screen display data corresponding to the chord name selected by said step of selecting, from a memory that stores, for each chord, playing-manner screen display data for displaying a playing manner screen indicative of a model playing manner corresponding to the chord; and displaying, along with the basic screen, a playing manner screen indicative of a model playing manner corresponding to the selected chord name on the basis of the playing-manner screen display data read out from said memory.

15. A computer program comprising computer program code means for performing all steps of a music performance assistance method when said program is run on a computer provided in a server apparatus connectable with a client terminal, said server apparatus comprising a first storage section that stores basic screen display data for allowing said client terminal to display a basic screen indicating a plurality of chord names and a second storage section that stores, for each chord, playing-manner screen display data for displaying a playing manner screen indicative of a model playing manner corresponding to the chord, said music performance assistance method comprising the steps of:

reading out basic screen display data from said first storage section and transmitting the read-out basic screen display data to said client terminal;

receiving, from said client terminal, request information requesting a playing manner screen corresponding to a desired one of the plurality of chord names included in the basic screen; and in response to the request information received from said client terminal, reading out, from said second storage section, the playing-manner screen display data for the playing manner screen corresponding to the desired chord name and transmitting the read-out playing-manner screen display data to said client terminal.

16. A computer program comprising computer program code means for performing all steps of a music performance assistance method when said program is run on a computer provided in a client terminal apparatus connectable with a server apparatus, said client terminal apparatus comprising a display device, said music performance assistance method comprising the steps of:

receiving basic screen display data for displaying a basic screen including a plurality of chord names transmitted by said server apparatus, said display device displaying the basic screen indicating the plurality of chord names on the basis of the basic screen display data received by said step of receiving;

selecting, on the basis of an instruction by a user, a chord name from among the plurality of chord names indicated on the basic screen displayed on said display device and transmitting, to said server apparatus, request information requesting a playing manner screen indicative of a model playing manner corresponding to the selected chord name; and receiving the playing-manner screen display data for displaying the playing manner screen transmitted by said server apparatus in response to the request information and displaying, along with the basic screen, the playing manner screen indicative of the model playing manner corresponding to the selected chord name on the basis of the received playing-manner screen display data.

* * * * *